United States Patent [19]
Edwards

[11] Patent Number: 5,209,608
[45] Date of Patent: May 11, 1993

[54] AIR GRAIN CONVEYOR SYSTEM

[76] Inventor: Kevin Edwards, P.O. Box 1570, 105 S. Mount Auburn Rd., Cape Girardeau, Md. 63702-1570

[21] Appl. No.: 779,267

[22] Filed: Oct. 18, 1991

[51] Int. Cl.⁵ .............................. B65G 53/58
[52] U.S. Cl. .................... 406/100; 406/131; 406/145; 416/223 R
[58] Field of Search ................ 406/42, 131, 130, 108, 406/99, 100, 145; 415/71, 72, 73, 175, 176; 416/176, 223 R

[56] References Cited

U.S. PATENT DOCUMENTS

| | | | |
|---|---|---|---|
| 1,543,261 | 6/1925 | Hickmann | 416/176 |
| 1,908,220 | 5/1933 | Chapman | 406/131 X |
| 2,161,074 | 6/1939 | Mertens | 416/176 |
| 2,987,221 | 6/1961 | Milton | 406/108 |
| 3,198,423 | 8/1965 | Clute | 415/72 |
| 3,773,392 | 11/1973 | Luiten et al. | 406/131 |
| 4,033,518 | 7/1977 | Fleming et al. | 406/42 X |
| 4,118,075 | 10/1978 | Lubbehusen | 406/131 X |
| 4,789,299 | 12/1988 | Demetrius et al. | 415/73 |

FOREIGN PATENT DOCUMENTS 1409826  7/1965  France ........................ 406/108

OTHER PUBLICATIONS

Spencer Pneumatic Conveying Systems, Bulletin 143-C, Jan. 1967.

Primary Examiner—Russell D. Stormer
Assistant Examiner—Gary C. Hoge
Attorney, Agent, or Firm—John K. Donaghy

[57] ABSTRACT

An air grain conveyor comprising a means for generating high velocity air, a grain ejection section, a connection between said means and said ejector section whereby the high velocity air is ejected into the ejection section, and a grain hopper attached to the ejector section whereby grain is drawn into the ejector section and conveyed to a discharge section wherein the velocity of air borne grain is slowed prior to deposit of the grain into a receiver.

10 Claims, 7 Drawing Sheets

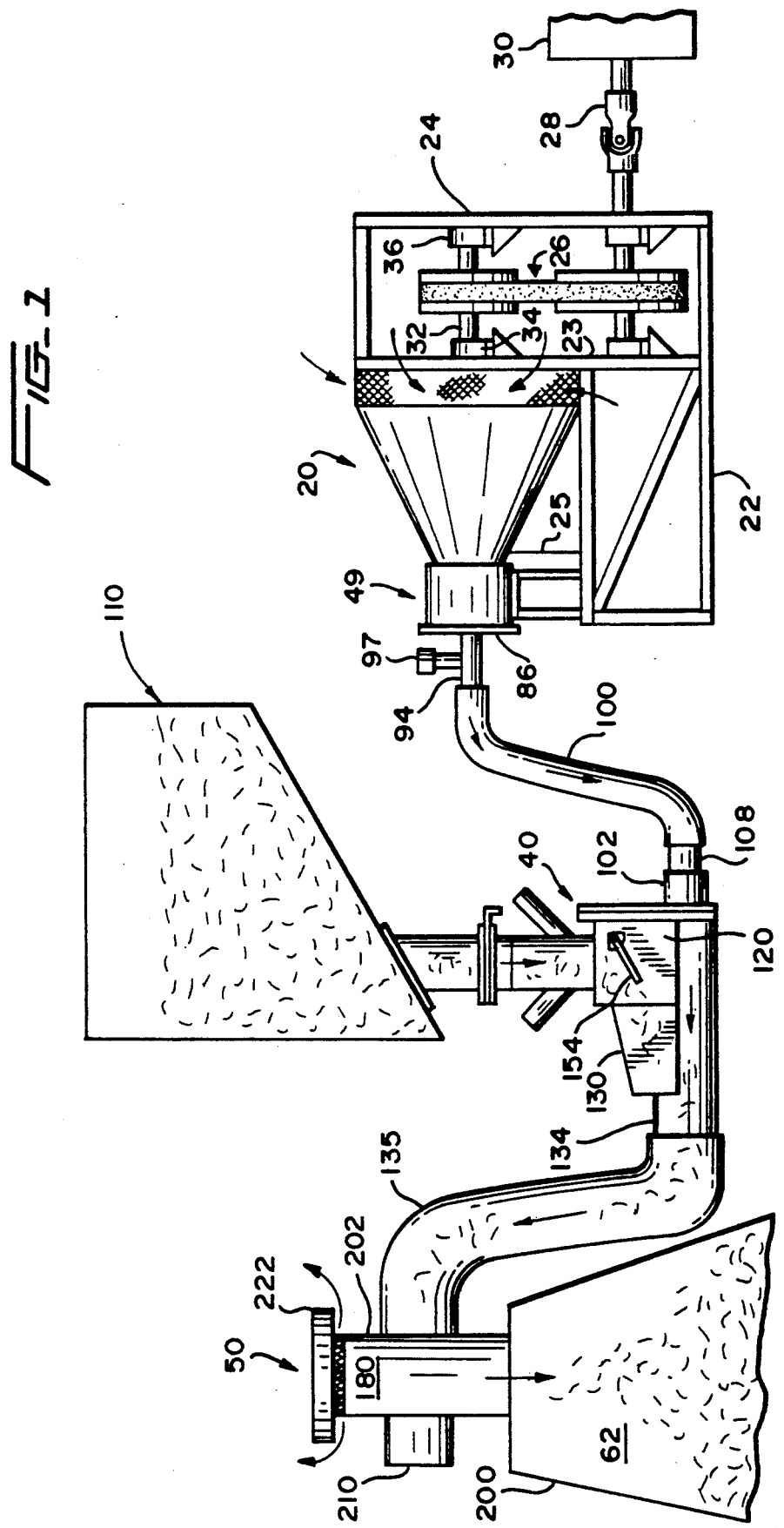

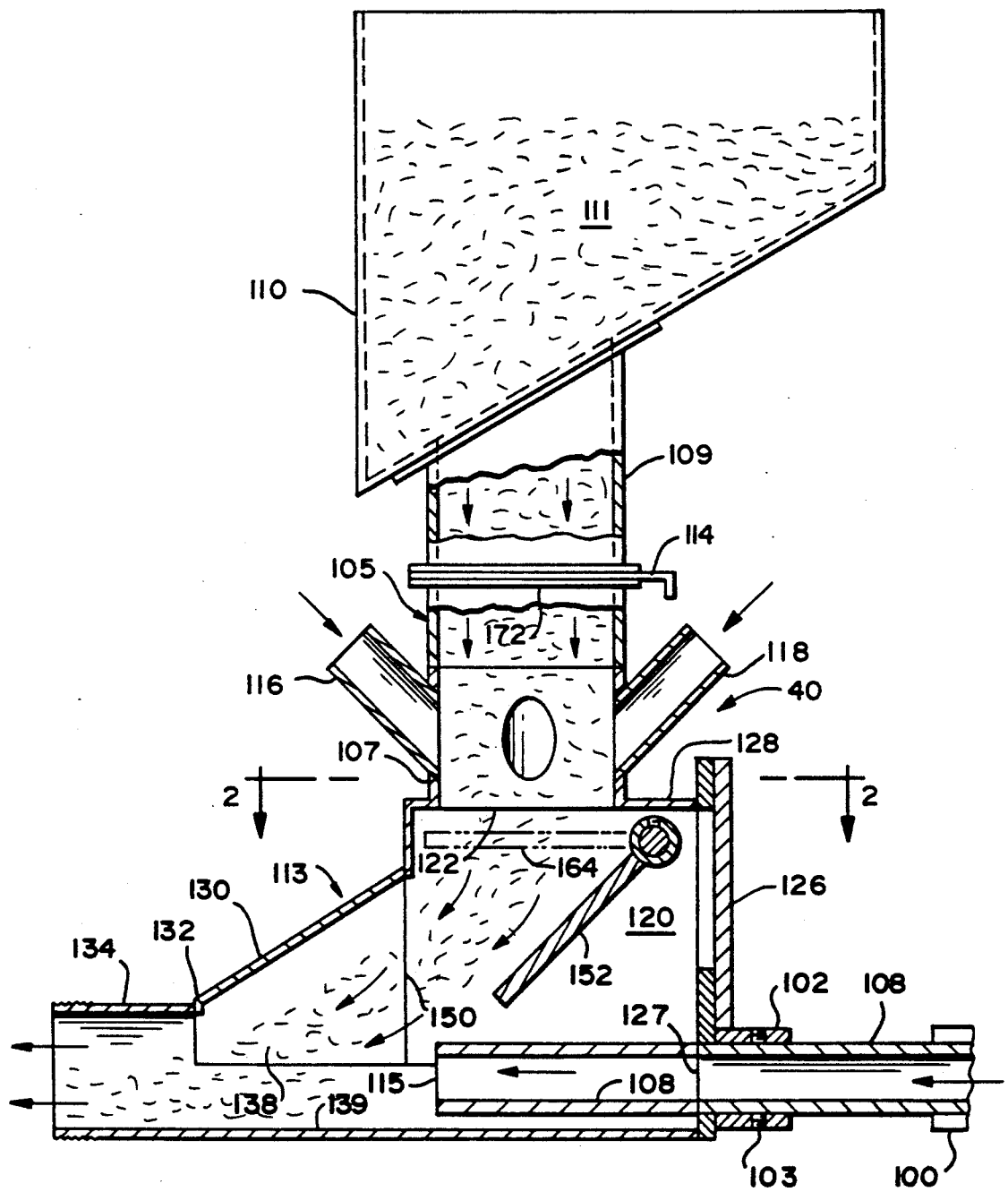

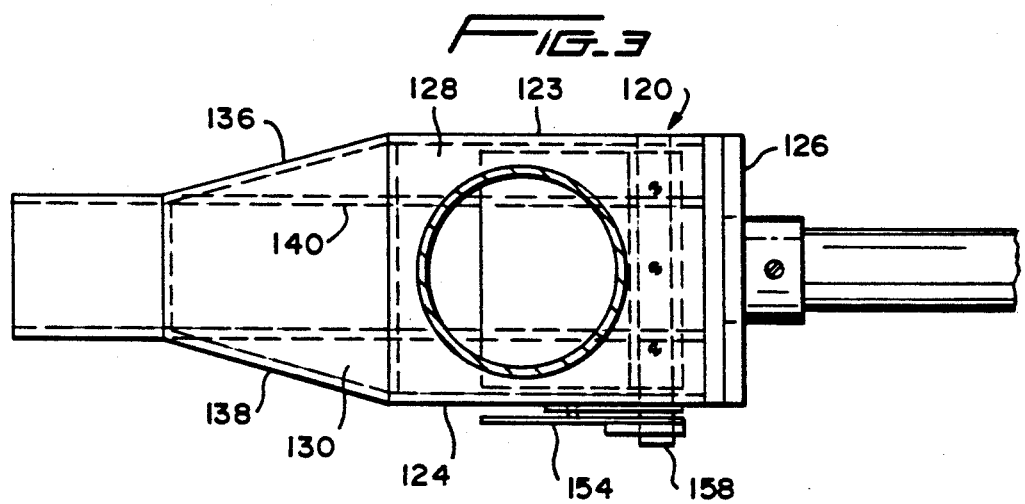
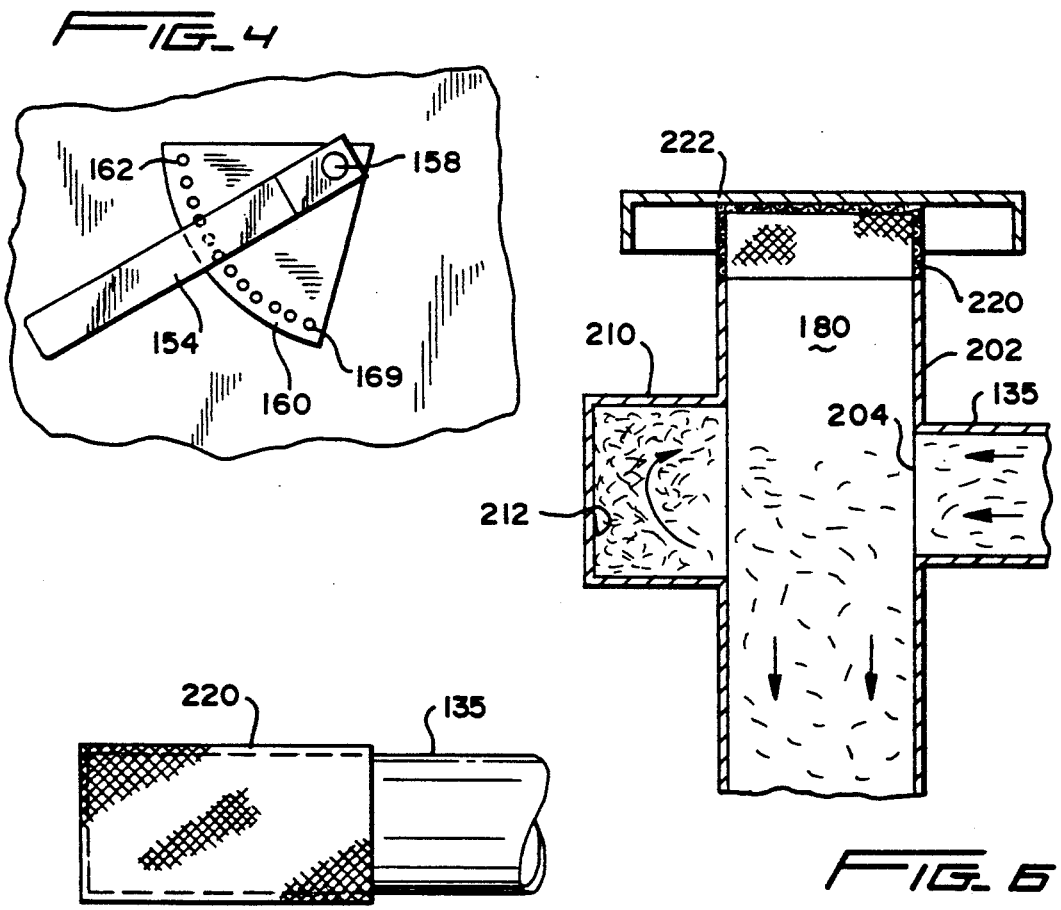

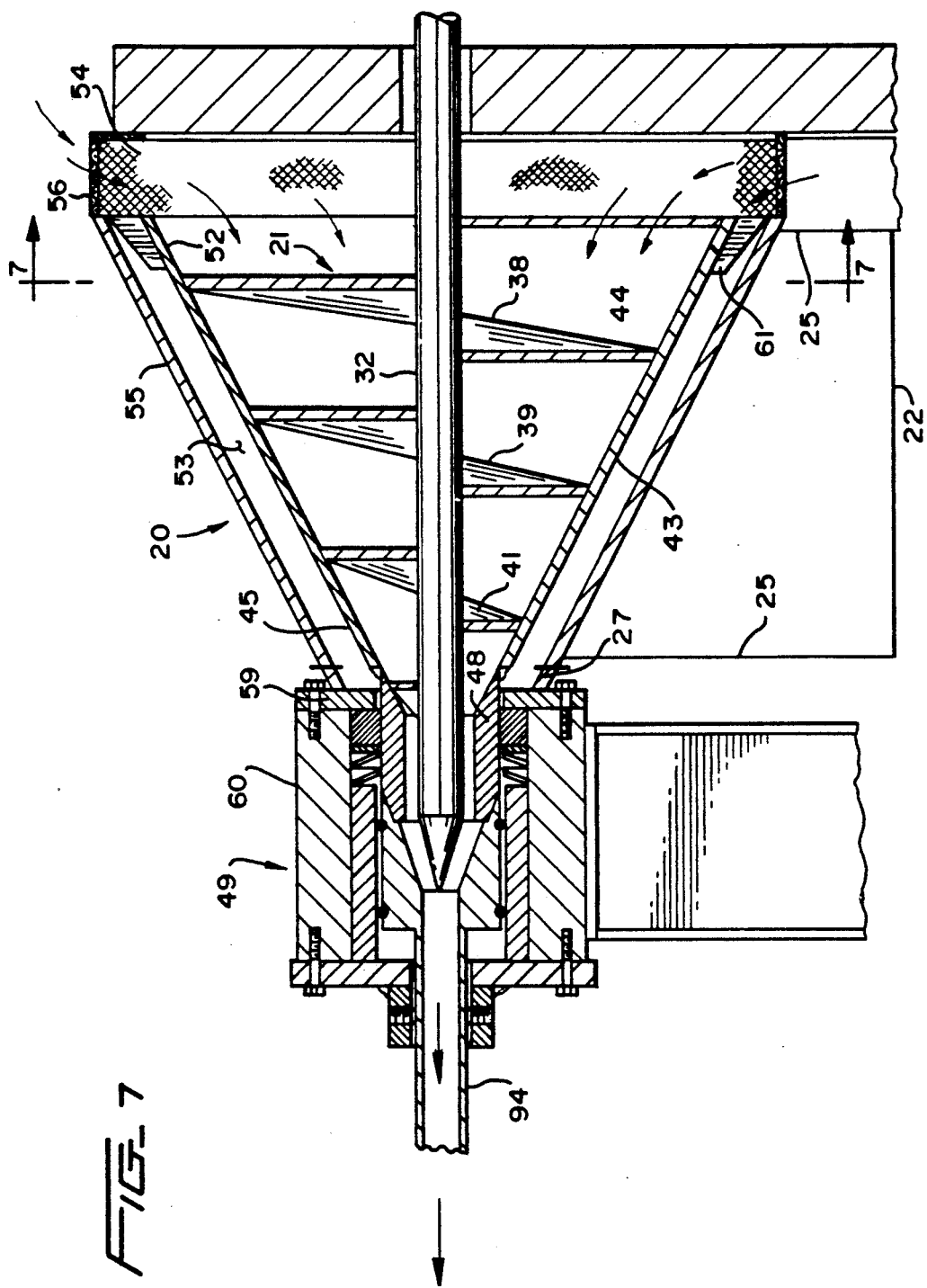
FIG_7

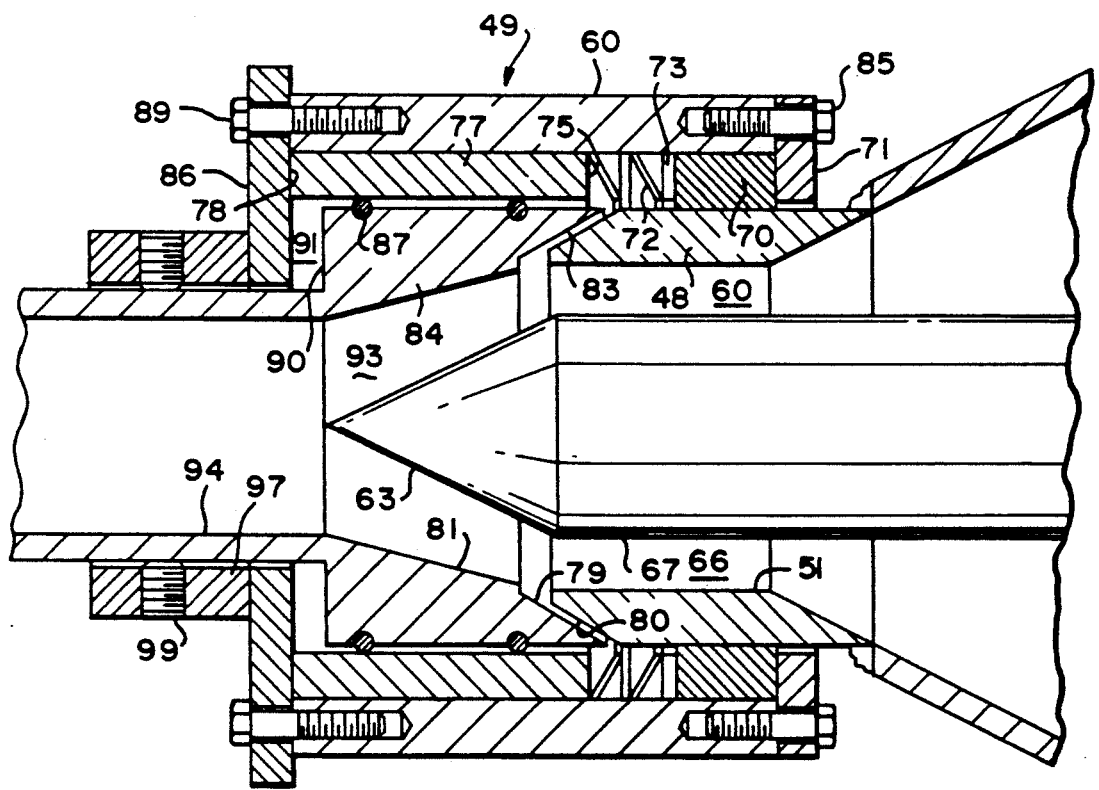

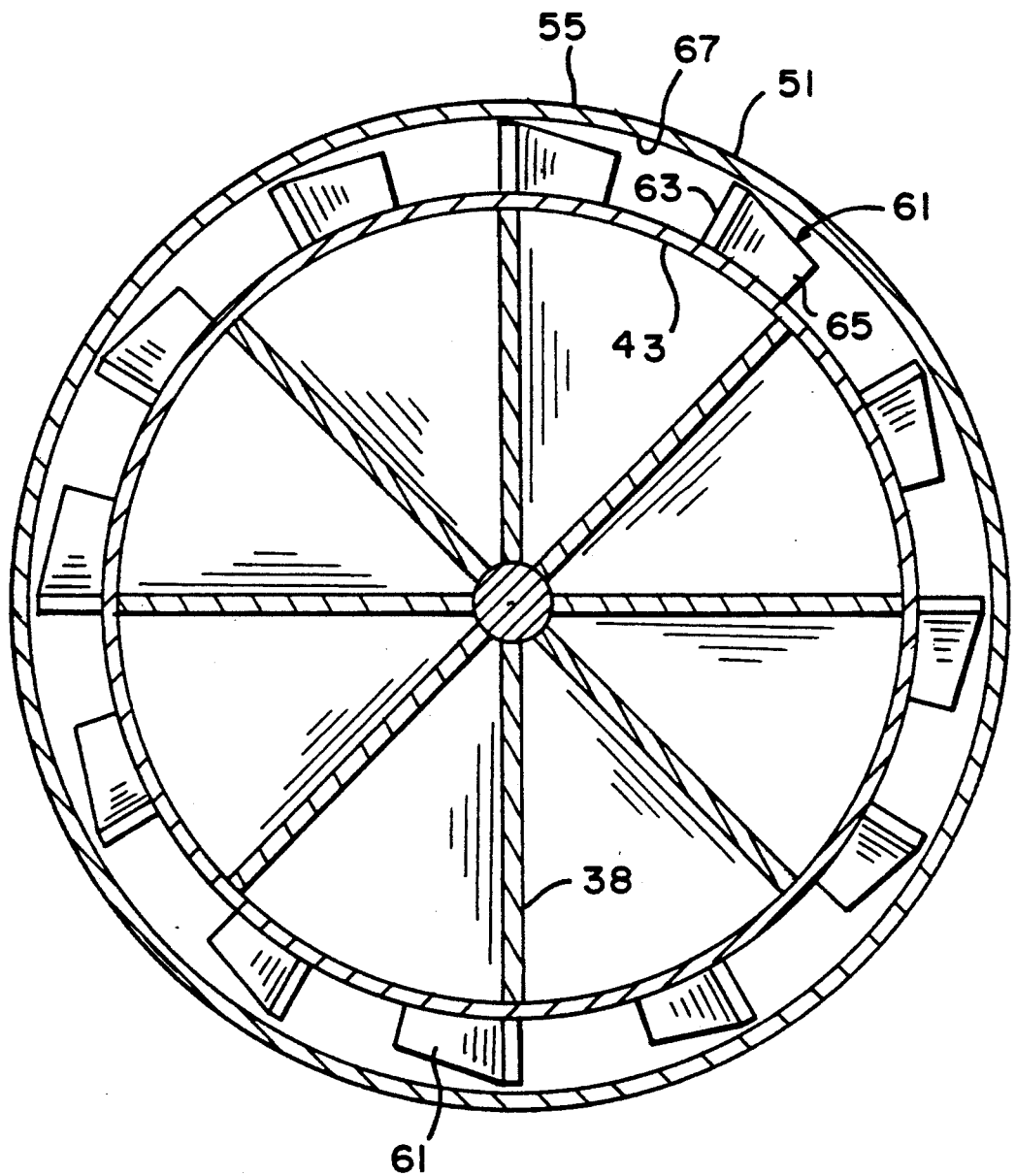
FIG_9

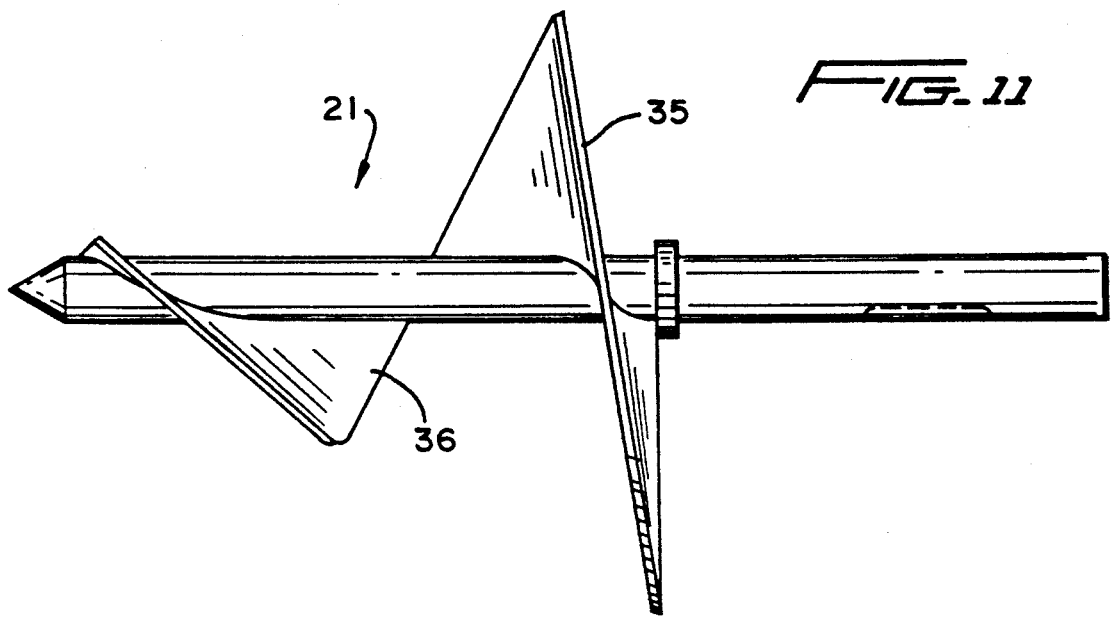
FIG. 11
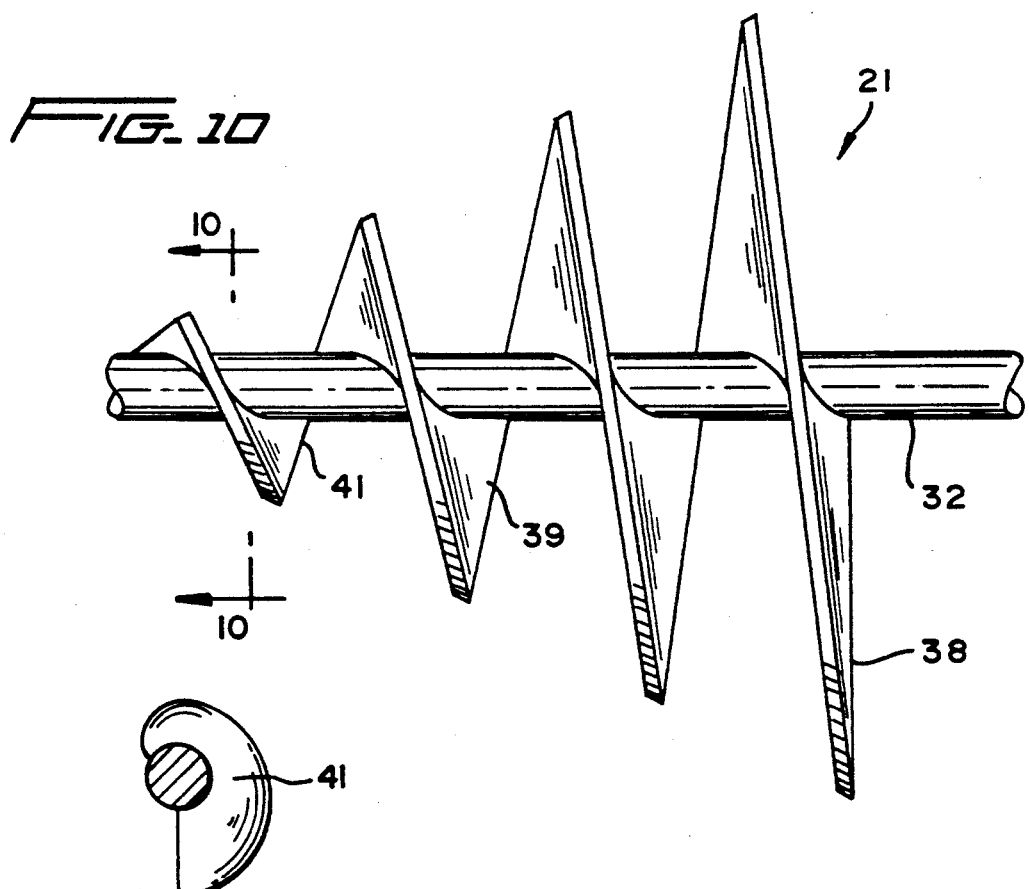
FIG. 10
FIG. 12

AIR GRAIN CONVEYOR SYSTEM

BACKGROUND OF THE INVENTION

1. Field of the Invention

This invention pertains to pneumatic conveyors for grain wherein pressurized air is derived from a unique air generator and delivered to an L-ejector where it is entrained in grain and conveyed to a deposit area.

2. BACKGROUND OF THE PRIOR ART

The prior art shows pneumatic conveyors for grain where the air for conveying the grain is derived from various sources such as fans, cyclones, and compressors. While these devices are useful, they are nonetheless complex and cumbersome.

Representative of the prior art devices are the following patents: U.S. Pat. No. 4,846,608 shows a pneumatic grain conveyor wherein a blower in combination with a cyclone or vortex; U.S. Pat. No. 4,846,605 shows a pneumatic grain conveyor with emphasis on the frame construction; U.S. Pat. No. 4,583,883 discloses a pneumatic conveyor for grain utilizing a fan to convey grain upwardly in a pipe; U.S. Pat. No. 4,433,946 is a discharge system for grain employing a fan and a separation chamber; U.S. Pat. No. 4,059,311 shows a process for discharging bulk material from a silo employing compressed air to assist in the discharge; U.S. Pat. No. 3,915,505 shows a pneumatic grain conveyor employing a fan to produce a suction air flow in a grain feed conduit; and U.S. Pat. No. 2,115,023 is an apparatus for handling pulverized material and granular material such as rye, wheat, etc.

There are specifically four (4) types of grain convey systems used to convey grain: screw conveyors, bucket elevators, belt conveyors and air blowers with rotary air lock feeders.

Air blower systems must use rotary air lock feeders to feed grain into a convey tube, pipe or hose. Otherwise, the grain would not enter the convey section properly because the air supplied by the air blower would flow into the section feeding grain. The rotary air lock feeder prevents the flow of air into the feed section.

SUMMARY OF THE INVENTION

The air generator and L-ejector of this invention are unique in that they have few moving parts.

Air velocities exiting air blowers of prior art devices will be less than air velocities exiting the air generator of this invention. The higher air velocities of this air grain convey system allows for a uniquely different apparatus for feeding grain into a conveying pipe, tube or hose, without the use of a rotary air lock feeder.

This invention supplies the need for a grain conveyor having few moving parts and employing a unique air generator for producing high velocity air to convey grain through a tube or the like.

The two (2) primary pieces of equipment in this system are the air generator and the L-shaped grain ejection assembly. Grain convey flow rates can be regulated through the feed control valve in the L-ejector or by changing diameters of convey pipes. Air assist ports in the L-ejector also permit regulation of grain flow in the system. Different air velocity can be attained by changing input speed, air generator size, screw flight design and air injection line inside diameters.

It is an object of this invention to provide an air grain conveyor system employing a unique air generator comprising a rotary screw to produce compressed air for conveying grain through a tube or the like.

Another object of this invention is to provide an air grain conveyor system employing a unique grain ejector assembly where high velocity air through a small diameter tube is injected into a larger diameter tube to induce flow of grain form a storage area to a delivery area.

And another object of this invention is to provide an air grain conveyor system wherein a grain ejector assembly employs an L-shaped device employing a negative pressure in the feed section to draw grain from a hopper and employing a positive pressure in the convey section to advance the grain to a storage or receiving area.

Yet another object of this invention is to provide an air grain conveyor system having a feed control valve in the L-shaped ejector device to regulate the volume of grain conveyed in the convey section. These may be manually operated or operated by hydraulic or pneumatic equipment.

Still another object of this invention is to provide an air conveyor system that employs air assist ports in an L-ejector device to provide optimum convey capacities.

These and other objects of the invention will become apparent to those skilled in the art to which the invention pertains from a reading of the following specifications when taken with the annexed drawings.

BRIEF DESCRIPTION OF THE DRAWINGS

FIG. 1 is a schematic view of the air grain conveyor system of this invention showing an air generator connected by an air hose to an L-ejector section having a grain storage or hopper thereabove and a convey line to a discharge and deposit area.

FIG. 2 is a cross-sectional view of an L-ejector assembly, storage bin, valves and air assist ports.

FIG. 3 is a top view of the L-ejector assembly taken along line 2—2 of FIG. 2.

FIG. 4 is a side view of the L-ejector assembly showing a control for the feed valve in the L-ejector.

FIG. 5 is a top view of a discharge for air from the deposit area.

FIG. 6 is a side view in section of the grain discharge to the deposit area.

FIG. 7 is a perspective view in section of the high velocity air generator employing flights on a rotatable shaft and air exit seal.

FIG. 8 is an enlarged perspective view in section of the air exit seal.

FIG. 9 is an end view of the air generator taken along the line 7—7 of FIG. 7 and showing flights on a shaft and coiling blades on the generator inner housing.

FIG. 10 is a perspective view of the air generator screw flights having a constant pitch.

FIG. 11 is a perspective view of the air generator screw flights having a varied pitch.

FIG. 12 is an end view of the air generator screw flights taken along the line 10—10 of FIG. 10.

DETAILED DESCRIPTION OF THE PREFERRED EMBODIMENT OF THE INVENTION:

Referring now in more detail to the drawings, FIG. 1 shows the air grain conveyor system of this invention comprising an air generator 20, an L-ejector assembly 40 having a grain bin 110 thereabove and a discharge 50 associated with a deposit or receiver 62.

The air generator 20 is supported on a frame 22 having a housing 24 for enclosing the belt and pulley drive 26 driven by any suitable source such as a power take off 28 from another machine 30. The frame 22 may have wheels whereby the generator 20 and frame 22 may be moved from place to place on a farm or wherever needed.

The generator 20 is a screw device 21 having a shaft 32, FIGS. 1 and 7, rotatable in a bearing 34 on an inside wall 23 of the housing 24. The shaft 32 has a continuous blade consisting of flights 38, 39 and 41 in the form of a screw secured thereto by any suitable means such as by welding. It will be seen that the flights 38, 39 and 41 on the shaft 32 are enclosed in and attached to an inner conical housing 43 at the peripheries 44 of the flights. It will be appreciated that when the shaft 32 rotates, the flights and the conical housing also rotates.

The small end 45 of the conical housing 43 is attached by press fitting or the like to a cylindrical housing 48 rotatable in a stationary non-contacting exit seal 49. The opposite large end 52 of the conical housing is journaled in an air intake 54 having an outer circumferentially extending wall 56. The air intake 54 and wall 56 may be an open grating or the like.

The outer conical housing 55 is attached to the wall 56 at one end and to the frame struts 25 and at its opposite end. A gap 27 exists between the open small end of the housing 55 and seal 49. A space 53 is provided between the inner housing 43 and the outer housing 55 for the passage of cooling air. The cooling air is generated in the space 53 by use of a plurality of cooling blades 61, FIGS. 7 and 9, extending around the periphery of the end 52 of the inner housing 43. The cooling blades 61 are attached to the outer end 52 of the housing 43 by any suitable means and each has a wall 63 generally parallel with the major axis of the inner housing 43. Another wall 65 extended away from wall 63 and generally is perpendicular to wall 63 and parallel to the minor axis of the housing 43. The tops of the walls 63 and 65 of the cooling blades 61 extend upwardly and terminate in close proximity to the inner wall 67 of the outer housing 55. It will be appreciated that the cooling blades rotate when the shaft 32 and housing 43 rotates and cooling air is generated in the space 53 to cool the generator 20. It is seen that the screw device 21, FIG. 10, has a constant pitch for generating air for a given RPM of the shaft. Whereas, the pitch of the screw 21, FIG. 11 having flights 35 and 36 is a varied pitch. The varied pitch screw 21 will produce a higher velocity of air exiting the seal 49.

The air exit seal 49 for the generator 20, FIGS. 7 and 8, comprises an outer wall or casing 60 enclosing the cylindrical housing 48 on the end 45 of the housing 43. A packing material 70 is retained in the housing 60 against the cylindrical housing 48 by a ring 71 and bolt 85. The packing 70 is held against the ring 71 by a spring 72 acting against a retaining ring 73. the other end of the spring 72 abuts the end shoulder 75 of air retaining tube 77 having its opposite shoulder 78 abutting the retaining ring 86 attached to the housing 60 by securing bolts 89.

Positioned inside the tube 77 is an adjustable sealing tube 84 having o-rings 87 in sealing engagement between it and the retaining tube 77. The sealing tube 84 has a flat end wall 90 having a clearance 91 between it and the retaining ring 86.

The other end of the tube 84 has a beveled shoulder 79 adjustable toward or away from a beveled shoulder 80 of the cylindrical housing 48. A gap 83 between the shoulders 79 and 80 may be varied by axially moving the tube 84 between the ring 86 and the shoulder 80 of housing 48. This adjustment permits widening or narrowing the gap 83 thereby minimizing air leakage out of the air seal 49. In this regard, it will be understood that a negative air pressure is created in gap 83 between the beveled shoulders 79 and 80. This negative pressure creates an air flow through the packing 70, spring 72, ring 73 and gap 83 to mix with high velocity air entering the seal 49 through the space 66 between the shaft end 61 and the inner wall 51 of the housing 48. It is seen that the shaft end 67 has a conical end 63 spaced from the inner wall 81 of sealing tube 84. This arrangement assists in directing high velocity air into the open space 93 and then into the open tube 94. The negative air flow as described functions to increase the total volume of air produced by the generator. More negative air flow through the gap 83 may be achieved by removing the retainer 71, packing 70, ring 73, and spring 72. The tube 94 extends away from wall 90 of the tube 84 and is attached to an end of conduit 100, FIG. 1. The tube 94 has a pressure relief valve 97 which functions to relieve the pressure in the line 100 should it exceed a predetermined value.

It will be seen that the sealing tube 84 can be moved axially of the tube 77 to control the size of the gap 83. Once the gap size is set, the tube 84 is held to the retaining ring 86 by a flange 97 secured to the ring 86 and to the tube 94 by set screws 99.

The conduit 100, FIG. 1, has its other end attached to a pipe 108 movable in inlet nipple 102 of a grain L-ejector assembly shown generally at 40.

The grain L-ejector assembly 40 is the means where high velocity air through a small diameter conduit induces flow of grain in a large diameter conduit, tube or hose. The L-ejector assembly 40 is an L-shaped device comprising a feed section 105, a convey section 113, and a housing 120 therebetween.

The feed section 105 is attached at one end to a vertical pipe 109 extending from a hopper 110 of grain 111 at its upper end. The other end 107 is attached to the housing 120, from which extends the feed section 113 as shown. A gate valve 112 permits removal of L-ejector 40 from the hopper 110. This valve also may be used to regulate the flow of grain from the hopper. Any type of valve may be used—such as, for example, a gate valve having a slide gate 114 which is moved back and forth in the pipe 109. This valve is manually operated, but it may be operated by hydraulic or pneumatic means as is well known.

The feed section 105 has a plurality of air assist ports 116 and 118 near the end 107 below the valve 112. The air assist ports permit additional air to enter the feed pipe 109 to optimize total convey capacities. In this regard, it will be appreciated that the air assist ports will have appropriate valves for opening and closing them and that pressurized air or atmospheric air may be introduced into the feed section 105 to increase total air pressure in the convey section 113 thereby increasing grain convey capacity.

The housing 120, FIGS. 2 and 3, has a port or opening 122 communicating with the end 107 of the feed section 105 below the air assist ports. The housing 120 has side walls 123 and 124 and a back wall 126. The back wall 126 has an opening 127 for reception of the pipe 108 attached to an end of the high velocity air feed line 100. The top wall 128 of the housing has an opening for receiving the end 107 of feed section 105. opposite the wall 126 of the housing 120 is an opening 150 defined by a tapered wall 130, side walls 136 and 138, wall 139 of feed pipe 134. The lower end 132 of the wall 130 is attached to a feed line or pipe 134 as shown. Side walls 136 and 138 join the sides 140 of the pipe 134 to form a closed housing having a large port or opening 150 for the passage of grain from the hopper.

It will be seen that the high velocity air enters pipe 108 from line 100 and exits the open end 115. The end 115 is a critical exit location for high velocity air and is in close proximity to and behind the opening 150. The end 115 of pipe 108 may be moved toward or away from opening 150 by sliding the pipe axially in the nipple 102. The set screw 103 is used for this purpose. The proximity of the opening 115 of the high velocity air pipe 108 behind the convey section opening 150 is critical to the generation of a negative pressure in the feed section 105 which pressure functions to draw grain into the housing 120 where it exits the opening 150 as indicated by the arrows. The flow of grain is then forced by the positive pressure of the high velocity air forward of the housing 120 comprised of the section 113 and the convey line 134.

A feed control valve 152 in the housing 120 functions to open or close in varying degrees the ports or openings 122 and 150. It will be seen in FIGS. 1, 3 and 4 that the valve 152 has an operating lever 154 which is connected to the valve 152 by a pin or bar 158 extending between the walls 123 and 124. The degree of the opening or closing of the ports 122 and 150 may be predetermined by use of setting 160 which may be any arbitrary set of calculations but usually in degrees of angles. The upper most location 162 indicates that the port 122 is closed as indicated by the phantom line 164 of the valve 152, FIG. 2. Subsequent downward movement of the lever 154 through the various indications 162–169 will indicate the degree of opening of the ports 122 and 150. A fully open valve would be indicated at the location 169.

It will be understood that the feed control valve will be used for regulating the flow of grain in the convey line 134 and for system start-up and shut down. In this regard, it will be understood that during start-up the feed control valve 152 will be operated after high velocity air is attained from the generator 20. And for shutdown, the feed control valve will be closed to allow purging of the convey section 113, 134. Then the high velocity air generator may be shut off.

FIGS. 1 and 6 show the convey pipe 134 connected to a discharge device 180 through a line 135. The discharge device 180 comprises a vertical pipe 202 fed by the smaller pipe 135 having one end attached to convey pipe 134 and the other end entering opening 204. Opposite the opening 204 is an open housing 210 wherein the air borne grain impacts against the wall 212. The housing 210 functions to slow the velocity of the air borne grain and to direct the grain in a curve as indicated by the arrow where it is directed downwardly by gravity into the receiver 200 which may be a storage container.

The upper end of the pipe 202 has an air exit in the form of a grating 220. A cap 222 covers the grating 220 as shown.

The uniqueness of this invention will be seen by its many applications such as a grain conveyor system replacing the more cumbersome screw conveyors and bucket elevators. This screw generator can be placed on the tongue of a grain trailer used to transport seeds to a planter. The screw generator of this invention can be employed on any system requiring the conveying of grain and as an air adjunct to a silage blower by providing assist air for the conveying the silage into a silo.

What I claim is:

1. An air grain conveyor comprising:
    a high velocity air generator;
    an exit seal on said generator;
    means for adjusting said exit seal to minimize air leakage in said seal;
    a grain ejector section having a housing for receiving high velocity air from the air generator;
    a hopper for grain on the ejector section;
    means connecting the air generator to the housing wherein a negative pressure draws grain from the hopper into the housing;
    a convey section on the housing whereby a positive pressure from the high velocity air conveys the grain in a convey line extending away from said convey section; and
    a discharge section for the grain connected to said convey line.

2. An air grain conveyor according to claim 1, wherein:
    said generator is a rotatable screw blower.

3. An air grain conveyor according to claim 1, wherein:
    said ejector comprises an L-section having a vertical feed line to the housing and a horizontal convey line away from the housing.

4. An air grain conveyor according to claim 1, wherein:
    said discharge section comprises a vertical tube for receiving the high velocity air borne grain includes means for slowing the grain whereby the grain falls by gravity through a bottom of said tube into a receiver and an air escape through a top of said tube for said high velocity air.

5. An air grain conveyor according to claim 1, wherein:
    said generator is a rotatable screw having a shaft connected to a take-off from a source of power.

6. An air grain conveyor according to claim 1, wherein:
    grain ejector section includes a vertical feed line from the hopper, a convey line and a housing therebetween and a high velocity tube has an end for the high velocity air from the generator in close proximity to the convey line whereby a negative pressure is generated in the housing and a positive pressure is generated in the convey line; and
    said negative pressure draws grain from said hopper into the housing and said positive pressure conveys the grain to the discharge section.

7. An air grain conveyor according to claim 2, wherein:
    said rotatable screw blower includes a continuous blade consisting of flights on a rotatable shaft, a housing for said flights and said shaft and an exit seal for the exit of high velocity air generated by the rotatable screw blower.

8. And air grain conveyor comprising:
    a generator for generating high velocity air;
    means on said generator for cooling said high velocity air;
    an exit seal on said generator;

means for adjusting said exit seal to minimize air leakage in said seal;

a grain ejector for receiving said high velocity air;

a hopper for grain on said ejector;

a grain feed section between said hopper and said ejector whereby grain is drawn into said ejector by said high velocity air;

a convey section attached to the ejector section whereby the grain is conveyed by said high velocity air; and a discharge section for the grain is connected to said convey section.

9. An air grain conveyor comprising:

a rotating generator for generating high velocity air including a continuous blade consisting of flights on a rotatable shaft inside a housing;

a stationary exit seal for receiving the high velocity air from the generator;

means for adjusting said exit seal to minimize air leakage in said exit seal;

an ejector housing for receiving said high velocity air from said exit seal;

a grain hopper on said ejector housing whereby grain is drawn into said ejector housing by said high velocity air;

a convey line for conveying the air borne grain away from the ejector housing by said high velocity air;

a discharge section for the grain is connected to said convey section;

means in the discharge section for slowing air borne grain; and a receiver for the grain is attached to the discharge section.

10. An air grain conveyor comprising:

a high velocity air generator;

an L-shaped grain ejector section having a housing for receiving high velocity air from the air generator;

a hopper for grain on the L-shaped ejector section;

means connecting the air generator to the housing wherein a negative pressure draws grain from the hopper into the housing;

a convey section on the housing whereby a positive pressure from the high velocity air conveys the grain in a convey line on the convey section;

a discharge section for the grain;

said generator is a rotatable screw blower;

said screw blower comprises a continuous blade consisting of flights on a rotatable shaft, an inner housing for the flights and shaft, said inner housing having a cylindrical outer housing, an air exit seal for the cylindrical housing, and an outer stationary housing for the exit seal; and said air exit seal comprises a casing for receiving the cylindrical housing having a beveled shoulder, a seal in the casing for sealing the area between the casing and the cylindrical housing, a converging seal adjustable toward and away from the cylindrical housing beveled shoulder, and an exit port for high velocity air exiting the inner housing.

* * * * *